C. J. PRANKARD, Jr.
DAMPENING MACHINE.
APPLICATION FILED MAY 14, 1907.
1,027,275.
Patented May 21, 1912.
5 SHEETS—SHEET 1.
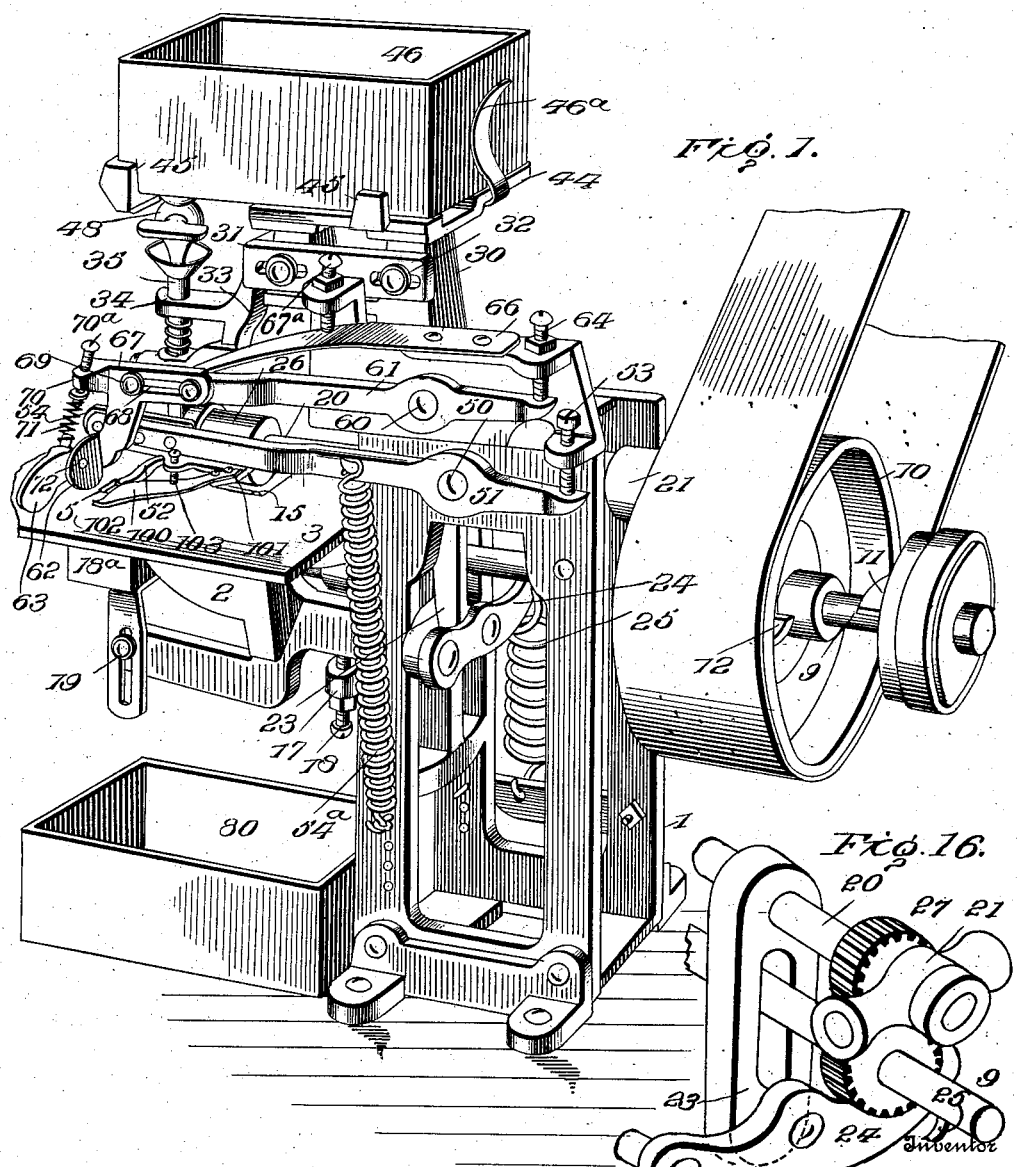

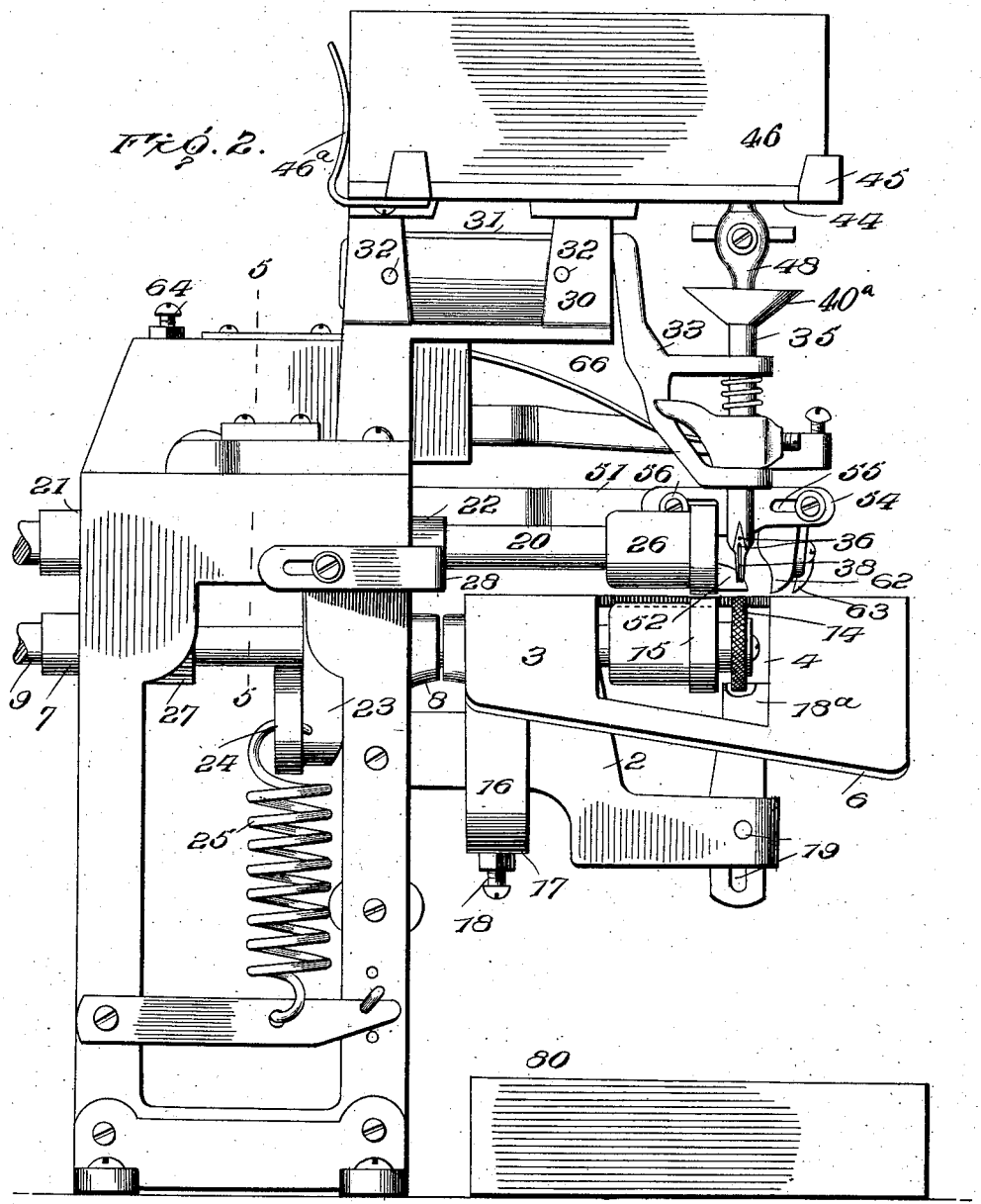

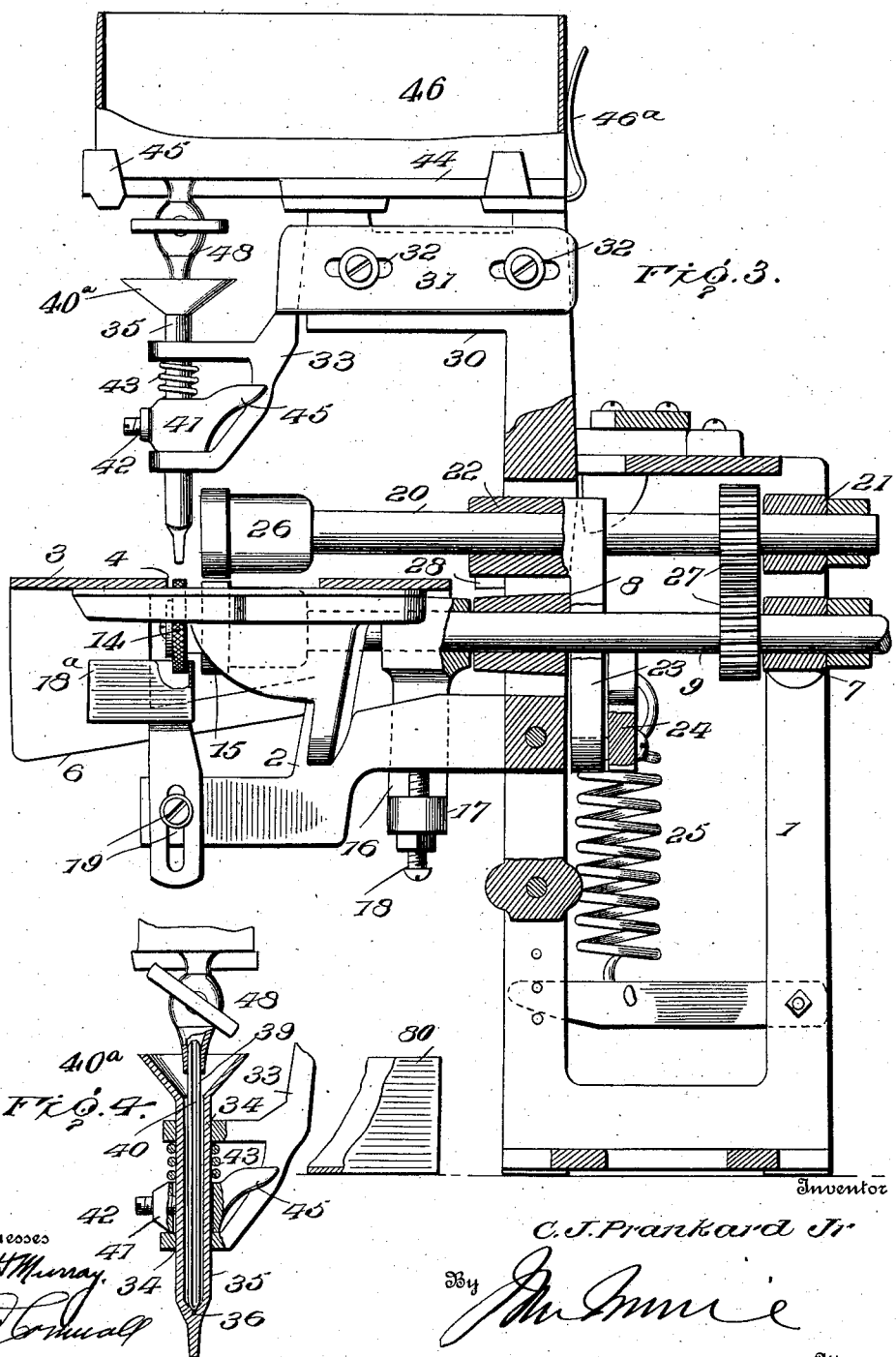

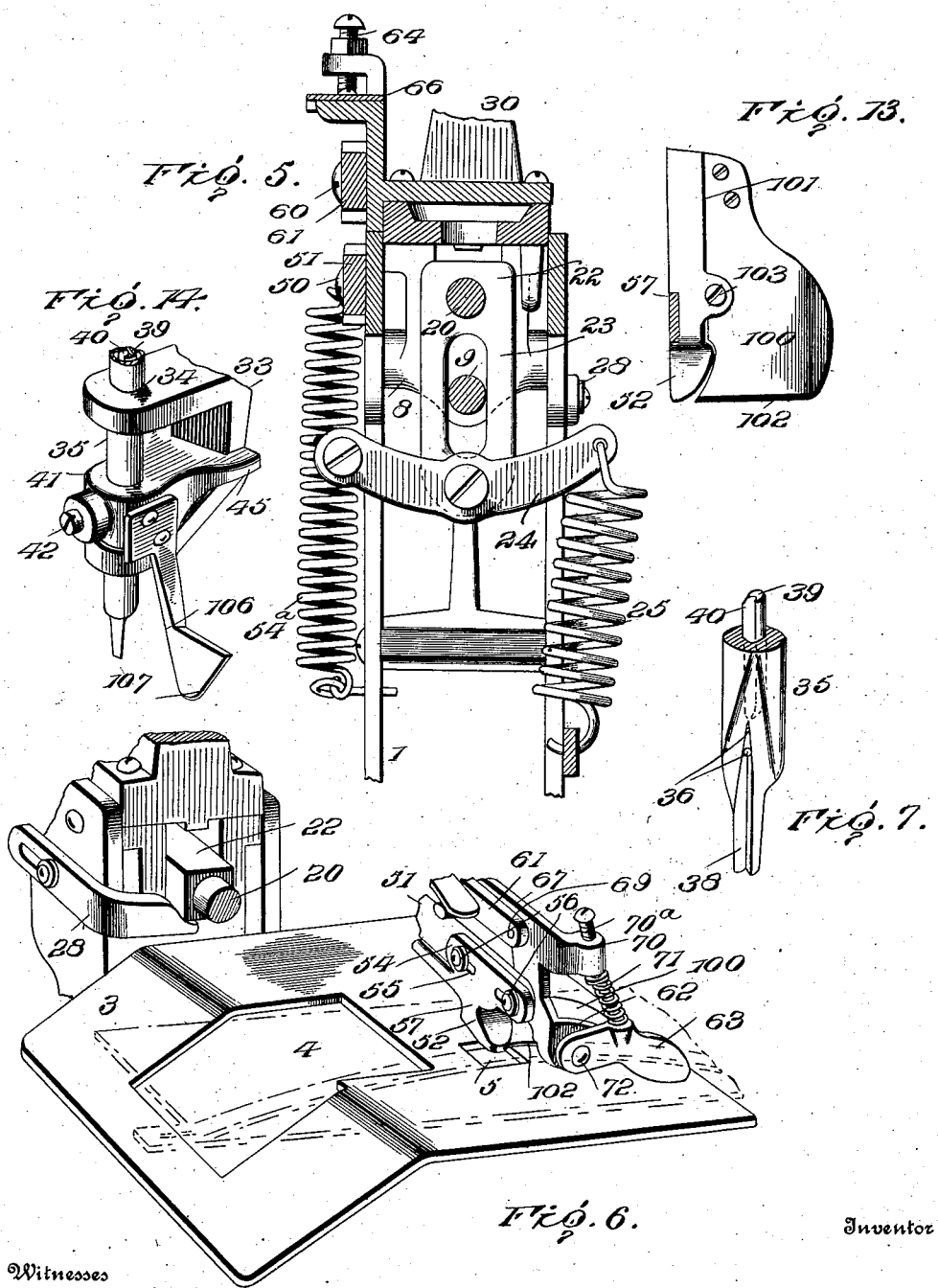

C. J. PRANKARD, Jr.
DAMPENING MACHINE.
APPLICATION FILED MAY 14, 1907.
1,027,275.
Patented May 21, 1912.
5 SHEETS—SHEET 5.
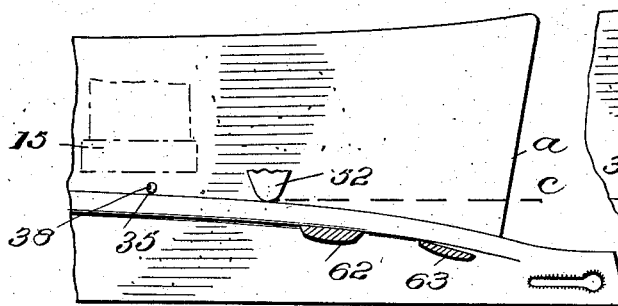
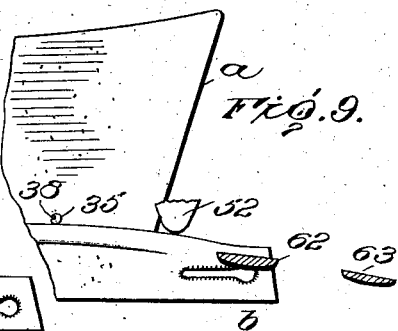
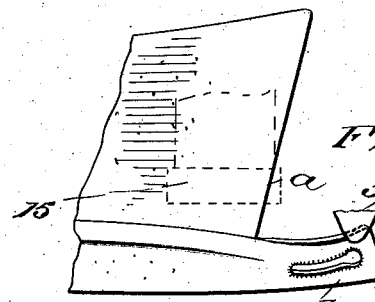
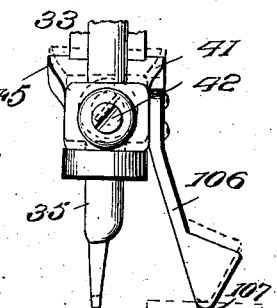
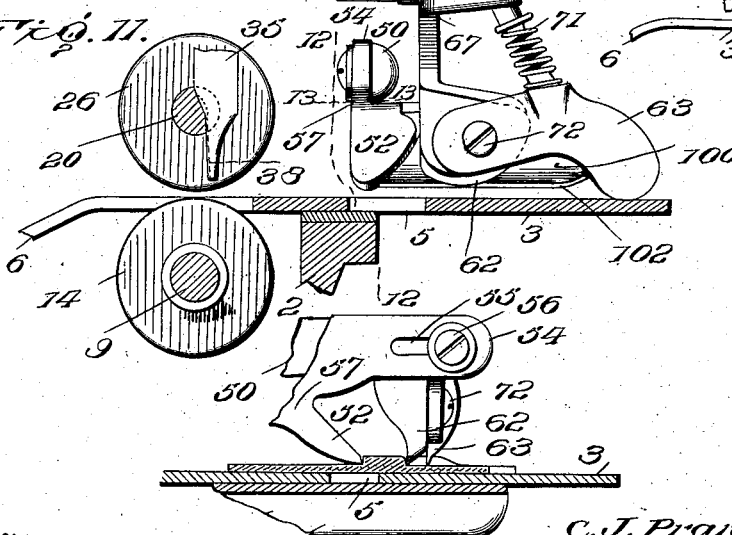
Witnesses
Inventor
C. J. Prankard, Jr.
By
Attorney

UNITED STATES PATENT OFFICE.

CHARLES JOHN PRANKARD, JR., OF TROY, NEW YORK.

DAMPENING-MACHINE.

1,027,275.  Specification of Letters Patent.  Patented May 21, 1912.

Application filed May 14, 1907. Serial No. 373,640.

*To all whom it may concern:*

Be it known that I, CHARLES J. PRANKARD, Jr., a citizen of the United States, residing at Troy, in the county of Rensselaer and State of New York, have invented certain new and useful Improvements in Dampening-Machines, of which the following is a specification.

This invention relates to improvements in dampening machines designed primarily for dampening the fold line of collars.

The prime object of the invention is to provide guiding means adapted to direct collars of various shapes to the dampening means whereby the folding line adjacent the collar seam is insured of being moistened.

According to my invention I provide a side seam guide for each side of the seam, each of which may be adjusted laterally or toward and from the collar independent of the other, in combination with a supplemental guide and a presser foot which insures the seam being directed to the side seam guides.

A further object of the invention is to provide feeding mechanism for feeding the collars, in combination with specific means for moistening the seam line.

Another object of the invention is to provide means coöperating with one of the side seam guides to permit the last tab end of a collar to be free, to make it possible to dampen collars with curved tabs close to the seam on the last end.

The invention consists of the specific details of construction and arrangement of parts, all of which will be hereinafter referred to and particularly pointed out in the claims.

In the drawings—Figure 1 is a perspective view of my invention. Fig. 2 is a rear elevation thereof. Fig. 3 is a front elevation, parts being shown in section to illustrate the construction. Fig. 4 is a detail sectional view of the tube for directing the moistening fluid to the collars. Fig. 5 is a section on the line 5—5, Fig. 2. Fig. 6 is a detail perspective view of the platform and the guides. Fig. 7 is a detail perspective view of the upper dampener. Fig. 8 is a diagram showing the position of the guides on a collar. Fig. 9 is a similar view illustrating the last edge of a collar having passed the forward guide. Fig. 10 is a similar view showing the collar free of the guides, the feed rolls pulling it through. Fig. 11 is a vertical section of the platform to show the normal position of the guides. Fig. 12 is a transverse section on the line 12—12, Fig. 11, with a collar in position. Fig. 13 is a detail section on the line 13—13, Fig. 11. Fig. 14 is a detail perspective view of the upper dampening element having an extension with which a collar coöperates to raise the dampening point the thickness of the material. Fig. 15 is a side view of the same, showing the parts raised in dotted lines by a collar. Fig. 16 is a detail perspective view of the power and countershafts, and the pivotal bearing of the latter.

The numeral 1, indicates a frame having an extension 2, on which is rigidly supported a platform 3, provided with an opening 4, for the feed wheels, and the lower dampening element, and a smaller opening 5, coöperating with one of the side seam guides. The rear end of the platform is inclined downwardly and to one side as shown at 6, to guide the collars away from the machine as they are being dampened.

A pair of bearings 7 and 8, are mounted in the frame 1, and support a power shaft 9, on the outer end of which is loosely mounted a band pulley 10, provided with a clutch member 12, adapted to be moved into engagement with the clutch member 11, to impart motion to said shaft. On the opposite inner end of the shaft 9, is a moistening wheel 14, and adjacent thereto on shaft 9 is a feed wheel 15. The wheel 14 is of metal, and its periphery is milled to assist in carrying the moistening fluid to the collar. The shaft 9, is adapted to be adjusted toward and from the platform 3, to properly position the dampening wheel 14, and feed wheel 15, said shaft 9, being mounted in a hanging bearing or support 16, which has an inturned end 17, in a plane with the extension 2, of the frame 1, and in the end 17, is a set screw 18 to engage the said extension.

Supported on the extension 2, directly under the moistening wheel 14, is a liquid receptacle 18ª, in which wheel 14, is moistened, and it is adjustable toward and from the platform by a slot and screw connection 19. It will be noted that the wall of the receptacle 18ª, extends well up toward the hub of the wheel 14, to effectively distribute the water over the periphery of the dampening wheel.

A countershaft 20, is mounted in bearings 21, and 22, the former being pivotally mounted in frame 1, while the bearing 22, is adjustably mounted, and is provided with an extension 23, connected to a pivoted lever 24, which has secured to its free end a spring 25, the latter normally tending to draw the countershaft toward the shaft 9. On the inner end of the countershaft 20, is a feed roll 26, disposed in a plane with the feed roll 15, and adapted to coöperate therewith to feed a collar through the machine. On the power shaft 9, and the countershaft 20, are gear wheels 27, which mesh with each other to transfer power from said power shaft to the countershaft. The downward movement of the countershaft 20, is limited by a stop 28, adjustably mounted on the frame 1, and while it is true the spring 25, tends to draw the upper feed wheel toward the lower feed wheel, the collar in passing between said wheels necessarily spreads them apart against the tension of said spring as will be readily understood.

To an extension 30, on the frame 1, is adjustably mounted an arm 31, by means of screw and slot connections 32, and extending from said arm is a bracket 33, formed with two members, each of which is provided with an alined opening 34, to receive the stem of a funnel shaped liquid receptacle 35. The lower end of the liquid receptacle 35, is reduced, and is located over the lower dampening wheel 14, and is provided on one side with an exit opening 36, through which the liquid passes into a groove 38. Loosely fitting in the liquid receptacle 35, is a stem 39, provided with a groove 40, which directs the liquid to the opening 36. The upper end of the stem extends into the funnel shaped mouth 40ª, of the receptacle for a purpose to be described. Secured to the reduced portion of the liquid receptacle 35, is an adjustable stop 41, held thereto by a set screw 42, and provided with an extension 45, straddling the arm of the bracket 33, and interposed between said stop and the top member of the bracket, is a coil spring 43, which normally forces the stop, consequently the liquid receptacle downwardly, the stop abutting against the lower member of the bracket, and the end of the receptacle 35, being in proper relation to the lower dampening wheel 14, to properly distribute the liquid as the collar is passed through the machine.

On the extension 30, of the frame 1, is a support 44, having lugs 45, between which is seated a tank 46, held in contact with the forward lugs 45, by a flat spring 46ª. The tank is provided with a depending cock 48, its free end being in vertical alinement with the liquid receptacle 35, and the upper end of the stem 39, fits within the mouth of said cock. The purpose of this connection is to permit the passage of just sufficient liquid when the cock is opened, to flow to the bottom of the receptacle, and thence out at the opening 36, along the groove to the collar.

Pivoted to the front of the frame 1, at 50, is a lever 51, carrying at one end a side seam guide 52, and at its outer end it contacts with a set screw 53, to limit the downward movement of the guide 52, a spring 54ª, serving to draw said guide downwardly toward the platform. The guide 52, comprises a base 54, having slots 55, which receives set screws 56, screwed into the end of the arm 51, and depending from the base, is a shank 57, which terminates at its lower end in the side seam guide proper. The outer face of the guide 52, is adapted to contact with the side of a seam of a collar, and it is normally raised from the plane of the platform 3, to permit the passage of the collar when being dampened, at the same time bearing downwardly thereon with sufficient pressure to cause it to guide the seam. The side seam guide 52, is located directly over the opening 5, in the platform 3, which relationship performs a very important function which will be hereinafter referred to in the description of the operation of the machine.

Pivotally mounted on the frame at 60, and above the arm 51, is a second arm 61, carrying at its free end a side seam guide 62, and a supplemental guide 63, while its opposite end is in contact with a set screw 64, to limit the position of the guides with relation to the platform, under the tension of a spring 66. The tension of the spring 66, is limited by a set screw 67ª, while set screw 64 normally keeps the side seam guide 62, slightly elevated above the platform.

The side seam guide 62, has a base portion 67, slotted at 68, through which set screws 69, pass, to hold it in lateral adjusted position. Depending from the base is a stem, and at its lower end is the guide proper which is disposed out of alinement with the side seam guide 52, and is adapted to engage the opposite side of the seam of a collar. Extending from the base 67, is a threaded lug 70, which receives a screw 70ª, which engages a spring 71, fitting over the upper end of the supplemental guide 63. The supplemental guide 63, is pivoted at 72, to the side seam guide 62, and is forced by the spring 71, downwardly into contact with the platform. The supplemental guide 63, is designed primarily to guide the seam of a collar into proper relative position between the two side seam guides 52 and 62, particularly when a seam is curved or of irregular shape. The supplemental guide 63, is disposed slightly out of the plane of the side seam guide 62, and drags on the collar.

In operation a collar is fed to the guides until the end is caught between the feed rolls. In this position it will be noted that the side seam guide 52, impinges one side of the seam, while the side seam guide 62, impinges the other side of said seam, and the supplemental guide acts as a retarder. As has been heretofore stated the pressure on the two guides is just sufficient to bear gently on the surface of the collar to insure contact with the same, the supplemental guide being under pressure, and in direct contact with the body of the collar. By reason of the position of the feed rolls, relative to the two side seam guides, and the supplemental guide, the path of movement of the collar will be such, as will cause the collar in its passage to present the line to be moistened adjacent the dampening means and adjacent the seam line. As shown in Fig. 10, after the rear end $a$, of the collar passes the side seam guide 62, if the tab be of the curved type its outer end will become loose under guide 52, and is moved under the influence of the feed wheels which causes it to travel in the path of movement set by the guides and thereby dampens a line corresponding exactly to the contour of the seam out to the extreme end of the collar, see Fig. 10. To effect this result the opening 5, is provided in the platform directly under the side seam guide 52, so that even though the rear tab $b$, of the collar passes under this guide, there is no pressure on it due to the opening, and thereby the feed wheels pull the collar in its predetermined path, and dampens the seam, as has been stated, to the end of the collar. The supplemental guide 63, is intended primarily to throw the seams of short curved collars around so that they will be fed between the two side seam guides 52, and 62, but with certain shaped collars this guide may be dispensed with.

It will be noted that but one dampening roll is employed, and coöperating with it is an upper dampening element 35. I have found that by the use of two revolving dampening devices, especially milled, the collar is marred on the outside to some extent, due to the pressure necessary between the two elements, and to obviate this difficulty I use but one roll, which does not press hard against the surface of the collar, as it is simply intended to contact lightly therewith, sufficiently for the fabric to absorb the moisture, while the tubular element moistens said fabric on the upper side. It is for this reason I employ the two feed wheels situated out of alinement with the guides, and designed solely for the purpose of drawing the collar through the machine.

Another point of advantage in the use of the machine as described resides in the particular arrangement of the guides. Each guide is separately mounted, and is capable of lateral adjustment independent of the other, and is also capable of independent adjustment toward and from the platform, so that they may be located in any given position laterally in the path of movement of the collar, and in relation to the platform. The latter adjustment is regulated by the set screws 53, and 64, and the tension of the respective springs thereon. Special attention is called to the fact that with these guides it is not proposed that the downward pressure shall be any more than just sufficient to cause the guides to fit snugly the seams, and hold the latter in proper position to be presented to the moistening devices. Inasmuch as the water from the tank 46, is constantly flowing downwardly toward the collar and into the receptacle $18^2$, it frequently happens that the latter will overflow, and to catch the drippings therefrom pan 80, is located under the platform.

The hanging bearing or support 16, is designed primarily to overcome the tendency of the end of the shaft 9, consequently the moistening wheel 14, moving up and down as collars are delivered to or leave the machine, when the power belt runs to the power wheel from below. By providing this construction, the set screw 18, can be regulated to properly position the shaft with relation to the counter-shaft 20, and thereby maintain a uniform pressure on the collars. If the power belt should run to the power shaft from above, obviously this adjustment would not be necessary.

The stem 39, I regard as of importance in that it conducts the water to the opening 36, in a small steady stream and positively insures a uniform distribution of the water on the collar. It has been found that without the stem, or its equivalent in a receptacle or conductor 35, the water is delivered in large and irregular drops, making it impossible to properly moisten a collar.

In connection with the two side seam guides, and the supplemental guide, I employ what I shall term for the purpose of clearness in the claims, an auxiliary guide 100. The auxiliary guide or guiding plate is mounted at one end on an extension 101, of the base 54, of the side seam guide 52. The free end 102, of the auxiliary guide 100, is elongated and is adapted to rest directly on a collar and against one side of the seam thereof, and it is turned up slightly at its front edge to permit the convenient insertion of a collar. A screw 103, working in the base and bearing on the auxiliary guide serves as a means for regulating the downward pressure of the outer free end of the latter, whereby the said pressure may be adjusted independent of the adjustment of the guide.

In Figs. 14 and 15, I have shown a slightly different form of my invention, which consists in fastening to the bracket 41, on the tubular portion of the receptacle 35, an extension 106. The lower end of the extension may be in contact with the platform 3, but is frequently slightly elevated therefrom, and is beveled on its front edge as at 107. The purpose of the extension is to elevate the point of the receptacle or upper dampening element, according to the thickness of a collar. As a front edge of a collar is forced under the beveled end of the extension it raises the bracket 41, hence the receptacle, sufficient to barely permit the said end of the collar to pass under. If desired I may dispense with the spring 43, which ordinarily forces the upper dampening element downwardly on the face of a collar, as the weight of the bracket is quite sufficient to return the said dampening element to its lowermost or normal position. It is quite necessary to have the point of the upper dampening element resting on the collars as they pass through the machine, and it is likewise desirable to have the point adjustable for either thick or thin collars.

What I claim is:

1. In a dampening machine, the combination with a support, of a lower shaft below the support, a dampening wheel on said lower shaft to dampen the seam line of a collar, means for dampening said wheel, a feed roll on said lower shaft and spaced from the dampening wheel, an upper shaft above the support, a feed roll mounted on the upper shaft adapted to coöperate with the lower feed roll and located to one side of the vertical plane of the dampening wheel and directly over the said lower feed roll, a tube located above the support, and the dampening wheel to dampen the upper side of the collar, and guides spaced from and independently of the feed rolls for guiding the seam of a collar between the dampening wheel and the tube.

2. In a dampening machine, the combination with a platform, a pair of shafts, one of said shafts being above the other, each of said shafts having a feed wheel revolving therewith, a milled dampening roller located on the outer end of the lower shaft and adjacent to and spaced from the feed wheel thereon, a tube located above said dampening roller, a spring for normally forcing the tube toward the dampening roller and means for guiding a collar between the milled dampening roller and the tube.

3. In a seam dampening machine, the combination with a fluid container, a conductor to conduct the fluid from the container to one side of the collar, a shaft, means revolved by the shaft to dampen the opposite side of the collar, a revolving feed roll spaced from the dampening means, a countershaft, a coöperating feed roll mounted on the countershaft, a side seam guide mounted to impinge one side of the seam of a collar, means for adjusting the said side seam guide toward and from the plane of damp, a side seam guide independent of the aforesaid guide, which impinges the opposite side of the seam of a collar, means for adjusting the latter side seam guide toward and from the plane of the line of damp, a platform, and adjustable means for spacing the side seam guides from or toward said platform.

4. In a seam dampening machine, the combination with a fluid container, a conductor to conduct the fluid from the container to one side of the collar, a shaft, means revolved by the shaft to dampen the opposite side of a collar, a revolving feed roll spaced from the dampening means, a countershaft, a coöperating feed roll mounted on the countershaft, side seam guides which impinge opposite sides of a seam of a collar, a platform, means for spacing the side seam guides from or toward said platform, and adjustable means to adjust the point of the fluid conductor toward or from the collar being dampened.

5. In a dampening machine, the combination with a platform dampening means, two side seam guides which bear against the opposite sides of the seam of a collar, a spring actuated guide bearing on the platform and carried by one of said side seam guides, and independent means for adjusting the tension of the spring actuated guide.

6. In a dampening machine, the combination with a platform, dampening means, two side seam guides which bear against the opposite sides of the seam of a collar, a supplemental guide carried by one of said side seam guides and means for independently adjusting the pressure of the supplemental guide toward the platform.

7. In a dampening machine, the combination with dampening means, a platform, two side seam guides which bear against the opposite sides of the seam of a collar, one of said side seam guides being located in advance of the other, means for independently adjusting said side seam guides, and spacing the same from the platform, and a supplemental guide in advance of said side seam guides, and means for causing the supplemental guide to normally bear upon the platform.

8. In a dampening machine, the combination with dampening means, a platform, a pivoted arm, a side seam guide carried by said arm, means for placing the arm under tension toward the platform, a second pivoted arm, a side seam guide mounted on said second arm, means for placing the said side seam guide carried thereon under tension, the two side seam guides being spaced from the top of the platform.

9. In a dampening machine, the combination with dampening means, a pair of pivotally mounted elements, a pair of side seam guides, one of said side seam guides being located in advance of the other, and also in advance of the dampening means, means for independently mounting said side seam guides to permit lateral adjustment of same on the pivotally mounted elements, and means for placing the said guides under tension downwardly.

10. In a dampening machine, the combination with a platform, a dampening means comprising a revolving element, an elongated liquid receptacle formed with an opening in one end and a groove adjacent said opening, a stem loosely mounted in said elongated liquid receptacle, means for supplying the elongated receptacle with liquid, and means for feeding a collar over the platform in the path of the dampening means.

11. In a dampening machine, the combination with a platform, dampening means comprising a revolving element, an elongated liquid receptacle formed with an opening in one end and a groove adjacent said opening, a grooved stem loosely mounted in said elongated liquid receptacle, means for supplying the elongated receptacle with liquid, and means for feeding a collar over the platform in the path of the dampening means.

12. In a dampening machine, the combination with a platform, dampening means comprising a revolving element, an elongated liquid receptacle formed with an opening in one end and a groove adjacent said opening, a grooved stem loosely mounted in said elongated liquid receptacle, and means for supplying the elongated receptacle with liquid, said means having a cock, the end of which fits over the stem.

13. In a dampening machine, the combination with a platform, dampening means comprising an elongated liquid receptacle, a bracket supporting said receptacle, means for adjusting the receptacle toward or from the platform, a rod loosely mounted in the receptacle, and means for supplying the receptacle with liquid.

14. In a dampening machine, the combination with dampening means, two side seam guides impinging the sides of the seam of a collar and being located out of alinement with each other, a supplemental guide, and means to actuate the supplemental guide independently of the two side seam guides, said supplemental guide being located out of alinement with the said side seam guides.

15. In a seam dampener, the combination with dampening means, a pair of side seam guides in advance of the dampening means, one of said side seam guides being mounted in advance of the other, a platform formed with an opening under the side seam guide nearest the dampening means, and collar feeding means.

16. In a dampening machine, the combination with a platform, a pair of shafts, each of said shafts having a feed wheel revolving therewith, a dampening roller located on one of said shafts and adjacent to and spaced from the feed wheel thereon, a dampening element located above said wheel, and means separate from the feed wheels for guiding a collar between the dampening roller and the dampening element.

17. In a dampening machine, the combination with a fluid container, a conductor to conduct the dampening fluid from the container to one side of a collar, a revolving dampening element beneath the conductor to dampen the opposite side of the collar, means in the path of movement of the collar and connected with the conductor to change the distance between the end of the conductor and the revolving dampening element according to the thickness of the collar being dampened, separate feed rolls, and guides spaced from the feed rolls to guide a collar to the dampening element.

18. In a dampening machine, the combination with dampening means, a platform formed with an opening in advance of the dampening means, a side seam guide located adjacent said opening and adapted to impinge one side of a collar seam, and forcing the end of the collar into said opening, the lower end of said side seam guide being normally above the plane of the upper surface of the platform.

19. In a seam dampening machine, the combination with a fluid container, a conductor to conduct the fluid from the container to one side of a collar, a shaft, means revolved by the shaft to dampen the opposite side of the collar, a revolving feed roll spaced from the dampening means, a countershaft, a coöperating feed roll mounted on the countershaft, a side seam guide mounted to impinge one side of the seam of a collar, means for adjusting the said side seam guide toward and from the plane of damp, a side seam guide independent of aforesaid guide which impinges the opposite side of the seam of a collar, and means for adjusting the latter side seam guide toward and from the plane of the line of damp.

20. In a seam dampening machine, the combination with dampening means, a pair of guides spaced from each other in direction of the path of movement of a collar, and adapted to bear on each side of the seam of the collar, the guide next the dampening means carrying an auxiliary guide which extends toward the other guide, the operative end thereof bearing on the collar and terminating adjacent said other guide.

21. In a seam dampening machine, the combination with dampening means, a pair of guides, the guides bearing against opposite sides of the seam of a collar, one of said guides carrying an auxiliary guide the operating end of which bears on the collar and extends substantially parallel to the other guide to a point opposite the latter, and means for independently adjusting the auxiliary guide.

22. In a seam dampening machine, the combination with dampening means, a pair of pivotally mounted guides adapted to bear on each side of the seam of a collar, one of said guides carrying an auxiliary guide, said guide being elongated and turned upwardly at its front end, and its opposite end adapted to bear on the surface of a collar, and means for adjusting the auxiliary guide.

23. In a seam dampening machine, the combination with dampening means, a pair of guides adapted to bear on each side of the seam of a collar, means for independently adjusting said guides, an elongated auxiliary guide carried by one of said former guides, and bearing on the face of the collar adjacent the seam thereof and independent means for adjusting said auxiliary guide.

24. A dampening machine comprising a platform, feeding means, a movable dampening element having a projection in the path of movement of an article to be operated upon, and independent of the feeding mechanism and adapted to be moved by the article to position the point of the dampening element with relation to the article, and means for vertically adjusting the dampening element.

25. A dampening machine, comprising a platform, feeding means, a tubular slidable dampening element, an extension on the dampening element which is normally in the path of movement of an article to be operated upon, and adapted to be moved parallel with the movement of the dampening element by the passage of the article to properly position said dampening element with reference to the surface of said article.

26. In a dampening machine, the combination with a fluid container, a conductor to conduct the dampening fluid from the container to one side of a collar, means to regulate the supply of dampening fluid, a shaft, means revolved by the shaft to dampen the opposite side of the collar, a revolving feed roll spaced from the dampening means, a countershaft, a coöperating feed roll mounted on the countershaft, a guide spaced from and independent of the feed rolls to impinge a collar on one side of the seam, a guide spaced from and independent of the feed rolls to impinge a collar on the opposite side of the seam, said guides guiding a collar so that the dampened fold line will be approximately in line with the seam, and a plate to contact against the outside surface of the collar in its passage by the guides.

27. In a dampening machine, the combination with a fluid container, a conductor to conduct the dampening fluid from the container to one side of a collar, means to regulate the supply of dampening fluid, a shaft, means revolved by the shaft to dampen the opposite side of the collar, a revolving feed roll spaced from the dampening means, a countershaft, a coöperating feed roll mounted on the countershaft, a guide spaced from and independent of the feed rolls to impinge a collar on one side of the seam, a guide spaced from and independent of the feed rolls to impinge a collar on the opposite side of the seam, said guides guiding a collar so that the dampened fold line will be approximately in line with the seam, a plate to contact against the outside surface of the collar in its passage by the guides, and adjusting means for changing the distance between the guides and plate.

28. In a dampening machine, the combination of a shaft, a dampening wheel for dampening one side of the collar on said shaft, a revolving feed roll spaced from the dampening roll, a countershaft, a coöperating feed roll mounted on the countershaft, means separate from the dampening wheel and feed rolls to conduct the dampening fluid to one side of the collar, a container for the dampening fluid, means to regulate the supply of dampening fluid, and guides impinging the collar on opposite sides of its seam to guide the collar to the dampening means, said guides being spaced from and independent of the feed rolls and dampening means.

29. In a dampening machine, the combination of a shaft a dampening wheel for dampening one side of the collar on said shaft, a revolving feed roll spaced from the dampening roll, a countershaft, a coöperating feed roll mounted on the countershaft, means separate from the dampening wheel, and feed rolls to conduct the dampening fluid to one side of a collar, a container for the dampening fluid, means to regulate the supply of dampening fluid, guides impinging the collar on opposite sides of the seam to guide the collar to the dampening means, said guides being spaced from and independent of the feed rolls, and dampening means, and a pan beneath the dampening wheel containing dampening fluid in which the dampening wheel is partly submerged.

In testimony whereof I affix my signature, in presence of two witnesses.

CHARLES JOHN PRANKARD, JR.

Witnesses:
CHARLES S. ALDRICH,
LUCY B. CLEXTON.

Copies of this patent may be obtained for five cents each, by addressing the "Commissioner of Patents, Washington, D. C."